(12) United States Patent
Woodford et al.

(10) Patent No.: US 8,761,472 B2
(45) Date of Patent: Jun. 24, 2014

(54) OBJECT LOCATION METHOD AND SYSTEM

(75) Inventors: Oliver Woodford, Cambridge (GB); Minh-Tri Pham, Cambridge (GB); Atsuto Maki, Cambridge (GB); Frank Perbet, Cambridge (GB); Bjorn Stenger, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 192 days.

(21) Appl. No.: 13/408,479

(22) Filed: Feb. 29, 2012

(65) Prior Publication Data

US 2013/0051639 A1     Feb. 28, 2013

(30) Foreign Application Priority Data

Aug. 23, 2011   (GB) .................................. 1114617.2

(51) Int. Cl.
     *G06K 9/00*         (2006.01)
(52) U.S. Cl.
     USPC ........................................................... 382/128
(58) Field of Classification Search
     USPC ................................................. 382/128, 281
     See application file for complete search history.

(56) References Cited

U.S. PATENT DOCUMENTS

| 5,638,465 A * | 6/1997 | Sano et al. ..................... 382/281 |
| 2009/0285466 A1 * | 11/2009 | Hipp et al. ..................... 382/131 |

FOREIGN PATENT DOCUMENTS

| JP | 2003-242509 A | 8/2003 |
| WO | WO 2007/072391 A2 | 6/2007 |
| WO | WO 2007/072391 A3 | 6/2007 |

OTHER PUBLICATIONS

Yimeng Zhang et al., "Implicit Shape Kernel for Discriminative Learning of the Hough Transform Detector", School of Electronic and Computer Engineering, Cornell University, © 2010, pp. 1-11.*
United Kingdom Combined Search and Examination Report issued Dec. 13, 2011, in Patent Application No. GB1114617.2.
D.H. Ballard, "Generalizing the hough transform to detect arbitrary shapes", Pattern Recognition, Pergamon Press, Ltd., vol. 13, No. 2, 1981, pp. 111-122.

(Continued)

*Primary Examiner* — Gregory F Cunningham
(74) *Attorney, Agent, or Firm* — Oblon, Spivak, McClelland, Maier & Neustadt, L.L.P.

(57) ABSTRACT

An object location method includes: analyzing data including plural objects each including plural features, and extracting the features from the data; matching features stored in a database with those extracted from the data, and deriving a prediction of the object, each feature extracted from the data providing a vote for at least one prediction; expressing the prediction to be analyzed in a Hough space, the objects to be analyzed being described by n parameters and each parameter defining a dimension of the Hough space, n is an integer of at least one; providing a constraint by applying a higher weighting to votes which agree with votes from other features than those votes which do not agree with votes from other features; finding local maxima in the Hough space using the weighted votes; and identifying the predictions associated with the local maxima to locate the objects provided in the data.

13 Claims, 10 Drawing Sheets
(8 of 10 Drawing Sheet(s) Filed in Color)

(56) References Cited

OTHER PUBLICATIONS

Bastian Leibe, et al., "Robust object detection with interleaved categorization and segmentation", International Journal of Computer Vision, vol. 77, 2008, pp. 259-289.

Olga Barinova, et al., "On detection of multiple object instances using hough transforms", Proceedings of IEEE Conference on Computer Vision and Pattern Recognition, 2010, pp. 2233-2240.

Office Action issued Jul. 23, 2013 in Japanese Patent Application No. 2012-184227 with English language translation.

Jun Ohya, "Recognizing 3D Objects from Range Images and Finding Their Pose Parameters", Technical Report of the Institute of Electronics, Information and Communication Engineers, vol. 89, No. 436, Feb. 1990, pp. 49-56 with cover pages.

Ayako Takenouchi, et al., "Combination of Object Detection and Path Planning Using the Environmental Information for Bin-picking", The Robotics Society of Japan, vol. 17, No. 7, 1999, pp. 130-137 with cover pages.

\* cited by examiner (a)

(b)

(a) (b) (c) (d) (e)

(a) (b) (c) (d) (e)

(f) (g) (h) (i) (j)

(a)

(b)

OBJECT LOCATION METHOD AND SYSTEM

FIELD

Embodiments of the present invention as described herein are generally concerned with the field of object registration.

BACKGROUND

The well known Hough transform was originally used as a method for detecting lines in images. The Hough transform has since been generalized to detecting, as well as recognizing, many other objects: parameterized curves, arbitrary 2D shapes, cars, pedestrians, hands and 3D shapes, to name but a few. This popularity stems from the simplicity and generality of the first step of the Hough transform—the conversion of features, found in the data space, into sets of votes in a Hough space, parameterized by the pose of the object(s) to be found. Various different approaches to learning this feature to-vote conversion function have been proposed.

The second stage of the Hough transform sums the likelihoods of the votes at each location in Hough space, then computes the modes (i.e. the local maxima) in the Hough space.

BRIEF DESCRIPTION OF THE DRAWINGS

The patent or application file contains at least one drawing executed in color. Copies of this patent or patent application publication with color drawing(s) will be provided by the office upon request and payment of the necessary fee.

DETAILED DESCRIPTION OF THE DRAWINGS

Figure 1:
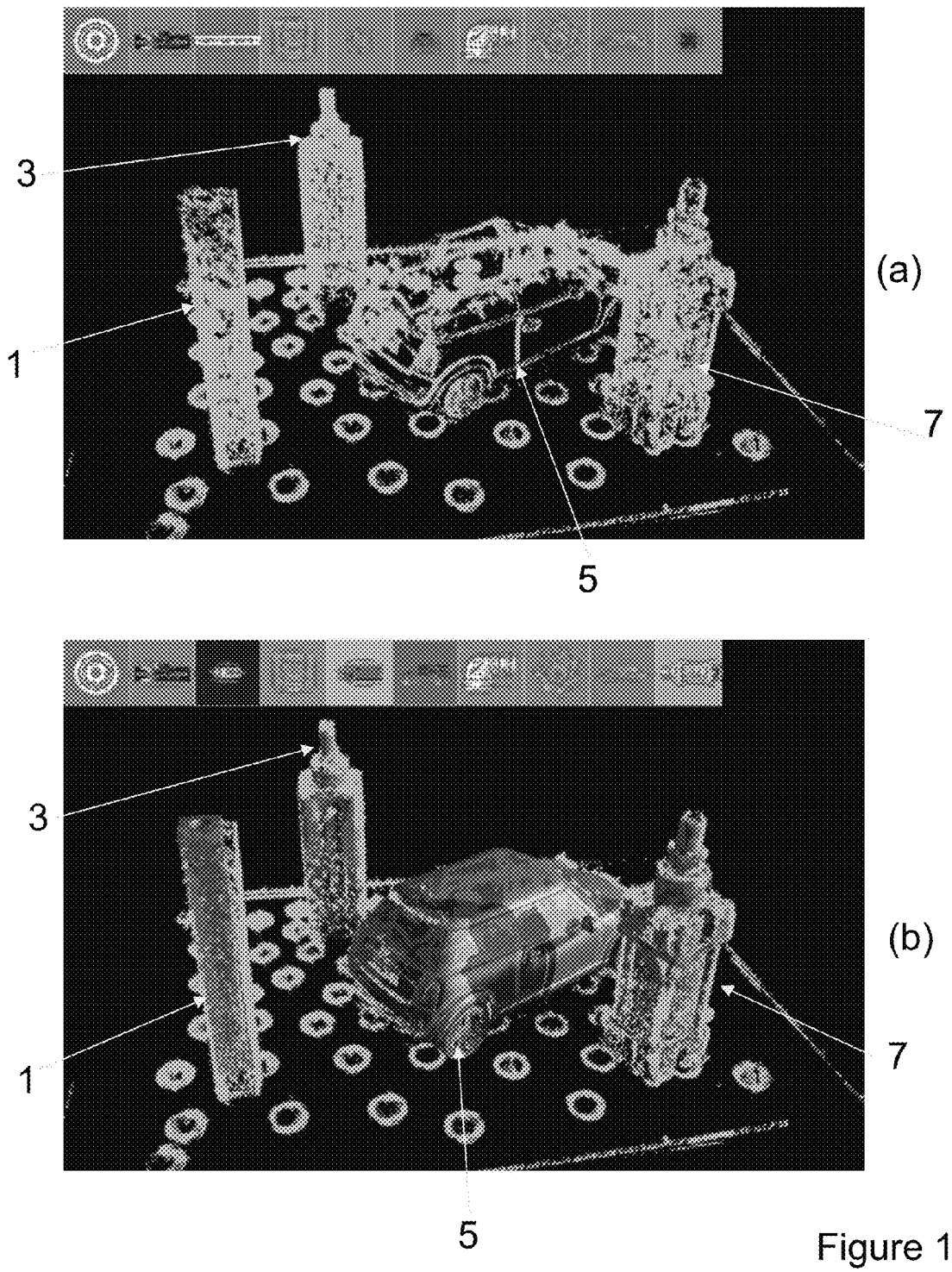
FIG. 1(a) is a point cloud generated from a captured 3-D image.
FIG. 1(b) demonstrates the objects recognised from the point cloud of FIG. 1(a)

According to one embodiment, a method of locating an object is provided, the method, comprising:

analysing data comprising a plurality of objects wherein each object exhibits a plurality of features, and extracting said features from said data;

matching features stored in a database with those extracted from said data, and deriving a prediction of the object, wherein each feature extracted from the data provides a vote for at least one prediction;

expressing the prediction to be analysed in a Hough space, wherein the objects to be analysed are described by n parameters and each parameter defines a dimension of the Hough space, where n is an integer of at least one;

providing a constraint implemented by applying a higher weighting to votes which agree with votes from other features than those votes which do not agree with votes from other features;

finding local maxima in the Hough space using the weighted votes; and identifying the predictions associated with the local maxima to locate the objects provided in the data.

The constraint may be provided by minimising the information entropy of $p(y|X,\omega,\theta)$ with respect to $\theta$, where y is the prediction of the object in Hough Space H which is the space of all object predictions, $X=\{x_{ij}\}_{\forall i,j}$ is a vote cast in H by N features, where i represents a feature, j represents a vote from the $i^{th}$ feature and $\omega=\{\omega_i\}$ is a weight attributed to a feature and $\theta=\{\theta_{ij}\}_{\forall i,j}$ is a weight attributed to a vote.

In an embodiment, $\theta$ may be given by:

$$\theta = \underset{\theta}{\operatorname{argmin}} - \sum_i \frac{p(y_i | X, \omega, \theta)}{q(y_i)} \ln p(y_i | X, \omega, \theta)$$

where $p(A|B)$ is the posterior probability that A is observed given B, $q(.)$ represents the sampling distribution from which the votes are drawn and the Hough space is sampled at the locations $Y=\{y_i\}$.

In a further embodiment, $\theta$ is minimised conditioned on the current weight of all other votes and wherein the process is repeated until convergence, wherein the vote weights for a feature f are updated by:

$$\theta_{fk}=1, \theta_{fj}=0, \forall j \neq k$$

where $$k = \underset{k=1}{\overset{J_f}{\operatorname{argmin}}} - \sum_{i=1}^{M} \frac{p_{fk}(y_i | X, \omega, \theta)}{q(y_i)} \ln p_{fk}(y_i | X, \omega, \theta)$$

and:

$$p_{fk}(y \mid X, \omega, \theta) = \omega_f K(x_{fk}, y) + \sum_{\forall i \neq f} \omega_i \sum_{j=1}^{J_i} \theta_{ij} K(x_{ij}, y)$$

In a yet further embodiment, k is simplified by substitution using an iterative conditional mode (ICM) proxy to:

$$k = \underset{k=1}{\overset{J_f}{\operatorname{argmax}}} p_{fk}(x_{fk} \mid X, \omega, \theta)$$

In the above embodiments, the Hough space is sampled at the locations $Y=\{y_i\}$. These may be regularly spaced intervals. In a further embodiment, the Hough space is sampled only at the locations of the votes. In this embodiment, the above equations may be written such that:

$$\theta = \underset{\theta}{\operatorname{argmin}} - \sum_{i=1}^{N} \sum_{j=1}^{J_i} \frac{p(x_{ij} \mid X, \omega, \theta)}{q(x_{ij})} \ln p(x_{ij} \mid X, \omega, \theta)$$

where p(A|B) is the posterior probability that A is observed given B and q(.) represents the sampling distribution from which the votes are drawn.

Here, again, the above equation is minimised conditioned on the current weight of all other votes and wherein the process is repeated until convergence. In an embodiment, this may be achieved by updating the vote weights for a feature f by:

$$p_{fk}(y \mid X, \omega, \theta) = \omega_f K(x_{fk}, y) + \sum_{\forall i \neq f} \omega_i \sum_{j=1}^{J_i} \theta_{ij} K(x_{ij}, y),$$

$$k = \underset{k=1}{\overset{J_f}{\operatorname{argmin}}} - \sum_{i=1}^{N} \sum_{j=1}^{J_i} \frac{p_{fk}(x_{ij} \mid X, \omega, \theta)}{q(x_{ij})} \ln p_{fk}(x_{ij} \mid X, \omega, \theta),$$

$$\theta_{fk} = 1, \theta_{fj} = 0, \forall j \neq k.$$

In a further embodiment, k is simplified by substitution to:

$$k = \underset{k=1}{\overset{J_f}{\operatorname{argmax}}} p_{fk}(x_{fk} \mid X, \omega, \theta). \quad (8)$$

In one embodiment, the weights were initially updated softly, i.e. the weights were not initially fixed to 0 or 1. This approach also helped to avoid ordering bias and in this way helped to avoid falling into a poor local minimum early on, thus improving the quality of solution found.

To set an initial vote weight for using the above method, $\{\theta_{ij}\}_{j \in \{1 \ldots J_i\}}$ can be set to an initial set of values, for example, those defined by a uniform distribution:

$$\theta_{ij} = \frac{1}{J_i}$$

In one embodiment, an update rule can be applied to each vote weight either synchronously or asynchronously, such as:

$$\theta_{ik} = \frac{p(x_{ik} \mid X, \omega, \theta)}{\sum_{j=1}^{J_i} p(x_{ij} \mid X, \omega, \theta)}$$

is applied.

This may be substituted by:

$$\theta_{ik} = \frac{p_{ik}(x_{ik} \mid X, \omega, \theta)}{\sum_{j=1}^{J_i} p_{ij}(x_{ij} \mid X, \omega, \theta)},$$

Where:

$$p_{fk}(y \mid X, \omega, \theta) = \omega_f K(x_{fk}, y) + \sum_{\forall i \neq f} \omega_i \sum_{j=1}^{J_i} \theta_{ij} K(x_{ij}, y)$$

Successive updates may be performed using either of the above rules to obtain an initial estimate of $\theta$. For example, 4 to 6 iterations may be performed.

In a yet further embodiment, the obtained values of $\theta$ are used directly in the Hough transform equation.

In one embodiment, the local maxima may be located by sampling the Hough space at predefined intervals. In a further embodiment, the local maxima are located by sampling the Hough space at the points where votes are cast.

In one embodiment, the above method is applied to identifying objects in an image or set of images, wherein the data to be analysed is image data and wherein the object is a physical object captured in the image.

In such an arrangement, the Hough space may be defined by at least 7 dimensions, wherein one dimension represents the ID of the object, 3 represent the translation of the object with respect to a common coordinate system and 3 represent the rotation of the object with respect to the common coordinate system. In a further embodiment, the Hough space is defined by 8 dimensions, where a dimension representing scale is added to the above 7 dimensions.

The Hough space may be defined by:

$$p(y \mid X, \omega, \theta) = \sum_{i=1}^{N} \omega_i \sum_{j=1}^{J_i} \theta_{ij} K(x_{ij}, y),$$

In one embodiment, $\theta$ is optimised by sampling the Hough space only at the location of votes.

In addition to image processing, the method of the present invention can also be used in an optimised search strategy where it is configured to return a list of search results from a plurality of search criteria, wherein the objects to be located are the search results and the features which vote for the objects are the search criteria.

One example of this is where the search results relate to diseases from which a patient may suffer and the search criteria are the symptoms presented by the patient.

According to one embodiment, an apparatus for locating an object is provided said apparatus comprising a processor, said processor being configured to:

analyse data comprising a plurality of objects wherein each object comprises a plurality of features, and extracting said features from said data;

match features stored in a database with those extracted from said data, and deriving a prediction of the object, wherein each feature extracted from the data provides a vote for at least one prediction;

express the prediction to be analysed in a Hough space, wherein the objects to be analysed are described by n parameters and each parameter defines a dimension of the Hough space, where n is an integer of at least one;

provide a constraint implemented by applying a higher weighting to votes which agree with votes from other features than those votes which do not agree with votes from other features;

find local maxima in the Hough space using the weighted votes; and identify the predictions associated with the local maxima to locate the objects provided in the data.

Embodiments of the present invention can be implemented either in hardware or in software in a general purpose computer. Further embodiments of the present invention can be implemented in a combination of hardware and software. Embodiments of the present invention can also be implemented by a single processing apparatus or a distributed network of processing apparatus.

Since the embodiments of the present invention can be implemented by software, embodiments of the present invention encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

A system and method in accordance with a first embodiment will now be described.

FIG. 1(a) is a point cloud of a scene comprising four objects 1, 3, 5 and 7. The point cloud is obtained using the apparatus described with reference to any of FIGS. 2 to 4. The point cloud comprises predicted points on a surface obtained by a 3-D imaging technique.

Methods in accordance with embodiments of the present invention allow recognition and registration of the objects shown in FIG. 1(a) as shown in FIG. 1(b).

Figure 2:
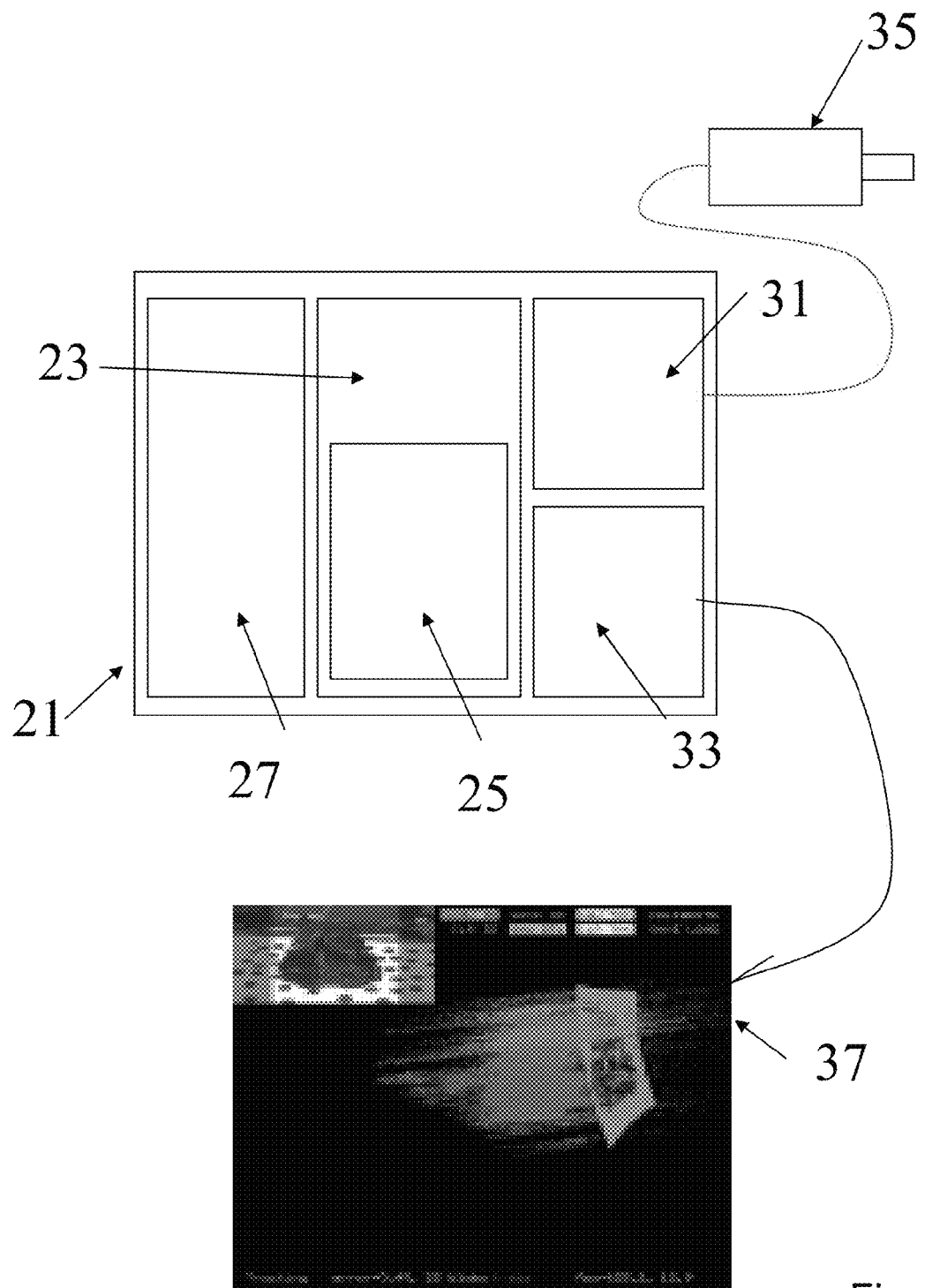
FIG. 2 is a schematic of an apparatus used for capturing a 3-D image.

FIG. 2 shows a possible system which can be used to capture the 3-D data. The system basically comprises a camera 35, an analysis unit 21 and a display 37.

The camera 35 is a standard video camera and can be moved by a user. In operation, the camera 35 is freely moved around an object which is to be imaged. The camera may be simply handheld. However, in further embodiments, the camera is mounted on a tripod or other mechanical support device.

The analysis unit 21 comprises a section for receiving camera data from camera 35. The analysis unit 21 comprises a processor 23 which executes a program 25. Analysis unit 21 further comprises storage 27. The storage 27 stores data which is used by program 25 to analyse the data received from the camera 35. The analysis unit 21 further comprises an input module 31 and an output module 33. The input module 31 is connected to camera 35. The input module 31 may simply receive data directly from the camera 35 or alternatively, the input module 31 may receive camera data from an external storage medium or a network.

Connected to the output module 33 is a display 37. The display 37 is used for displaying captured 3D data generated from the camera data received by the camera 35. Instead of a display 27, the output module 33 may output to a file or over the internet etc.

In use, the analysis unit 21 receives camera data through input module 31. The program 25 executed on processor 23 analyses the camera data using data stored in the storage 27 to produce 3D data and recognise the objects and their poses. The data is output via the output module 35 to display 37.

The display shows the 3-D data as it is being slowly built up. The system will determine the depth of many points at once.

As the camera is moved around an object, more and more data is acquired. In this embodiment, as the data is acquired, it is continually processed in real-time and builds up the figure of an object on the screen.

Figure 3:
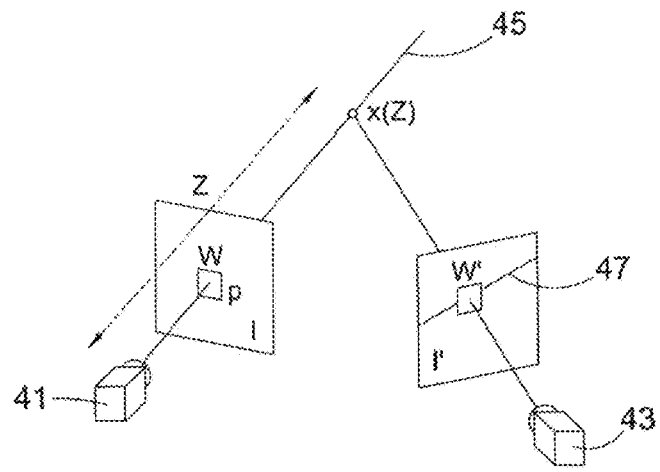
FIG. 3 is a schematic to aid explanation of the system of FIG. 3.

FIG. 3 is a schematic which is used to explain how the depth map is constructed using the system of FIG. 2. A camera 1 is moved between first position 41 which will be referred to the first image position and second position 43 which will be referred to as the further image position. At the first image position I, a pixel p is shown. At pixel p, point x(Z) is shown on the object. The point x(Z) lies at a distance (X) from a reference point. In this specific example, the reference point is the camera in first position 41. However, the reference point could be any point. The point x which is shown at pixel p lies along epi-polar line 45. From the data in 2D image I, it is impossible to judge the depth Z. However, the position of the line along which Z lies can be determined.

When camera 1 is moved to section position 43, the image P is captured. As it is known that point x lies along line 45, it is possible to project this line onto image space I' and therefore one skilled in the art will know that the point x on the object (not shown) will lie somewhere along the projected line 47 in image space P.

The position of the projected line 47 can be determined once the position of the camera at the first position 41 and the second position 43 are known. Further, as the images are captured by a continually moving video camera, the distance between the position 41 and position 43 is very small. In order to provide a clear diagram, in FIG. 3, the difference between these two positions has been exaggerated. In reality, this difference is very small therefore the pixel p at which point x shown in the reference image will only move within a small area w from the image taken in the first position I to the image of the second position I'.

This area w when projected onto the second image I' as w' then means that it is only pixels which fall along the projection of epi-polar line 47 within the projection of area w' that need to be processed to look for similarity with the pixel p.

A known matching algorithm is then performed to see if the pixels along line 47 match with pixel p. Correspondence scores can be evaluated using systems such as normalised cross correlation (NCC), sum of absolute differences (SAD) or another metric on w and w'.

Figure 4A:
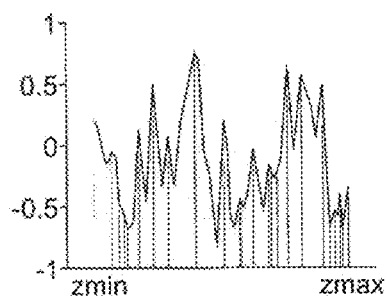
FIGS. 4(a) to (d) are data showing the operation of the system of FIG. 2.

A plot the matching score or similarity score is shown in FIG. 4a for distances between band Zmin and Zmax. It has been found that in well textured scenes, the correct depth is typically very close to a local maxima of the matching score. Therefore, just the local maxima which will be denoted as $x_1 \ldots, x_N$ are considered from hereon.

The distance Z can be projected onto the second image P. The first approximation of the distance Z will be based on some information concerning the general size of the object.

The system is operating, the camera will then move to a third position (not shown in FIG. 3) in third position, the same analysis can be performed and a similarity score can be performed in the same manner as described with reference to FIG. 3 for position 23.

Figure 4B:
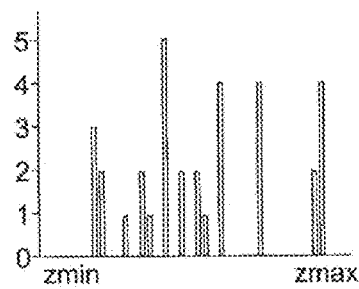
Figure 4C:
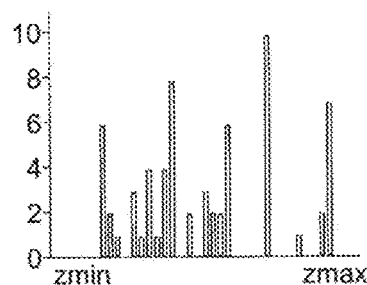
Figure 4D:
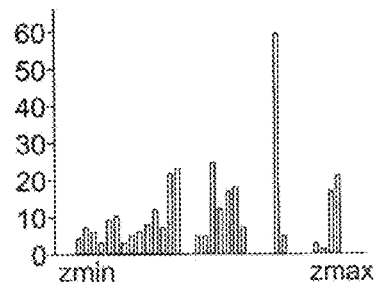

Two similarity scores can then be added together. The scores for both further images are represented in terms of Z along the epi-polar line 45. In FIG. 4b, the similarity scores from six frames are added together. When there are only very few images taken as is the case of FIG. 4b, the local maxima is heavily multimodal. This is due to various pathologies in the problem domain such as occlusion, time warping, repetitive texture etc. In FIG. 4c, further similarity scores, the similarity scores from 15 frames are added and in FIG. 4d, the similarity scores from 60 frames are added. As more and more images are added, the multimodal histogram which is initially shown in FIG. 4b is seen to move to be more unimodel in character as shown in FIG. 4d. Here, the data is converged to a clearly defined peak with a significant percentage of uncorrelated outlier data points. The matching score maxima for each incoming video frame reinforces each other gradually removing the ambiguities in pixel depth.

The above has assumed that the object is stationary and that the camera is moving. However, it is possible for the camera to be fixed and for the object to be moving, e.g. for example on an assembly line or the like.

Other systems may be used to capture 3D image data, for example, systems built on photometric stereo principles where an object is illuminated from three different directions. The system is configured such image data captured for the illumination from the three different directions can be isolated. This may be done by either temporally separating the illumination by the three light sources or by using light sources which are capable of emitting radiation of three different colours. For example, the colours red, green and blue may be selected as it is possible to obtain video cameras which can distinguish between these three colours. However, it is possible to use any three lights which can emit colours which can be distinguished between by a video camera. It is also possible to use lights which emit radiation in the non-optical radiation bands. The exact shade of colour or frequency of radiation chosen is dependent on the video camera. In one embodiment, the lights are projectors and filters are provided so that the scene is illuminated with radiation of a particular colour from each projector. In a further embodiment, LEDs are used to illuminate the object.

The above has suggested a technique of capturing 3D object data using multi-view stereo or photometric stereo techniques. However, other methods are possible such as LIDAR sensors, time of flight sensors and active lighting depth sensors, as well as CAT scanners and MRI scanners.

Next, a method for detection of the objects and their poses in the captured 3D data of the scene will be described.

Figure 5:
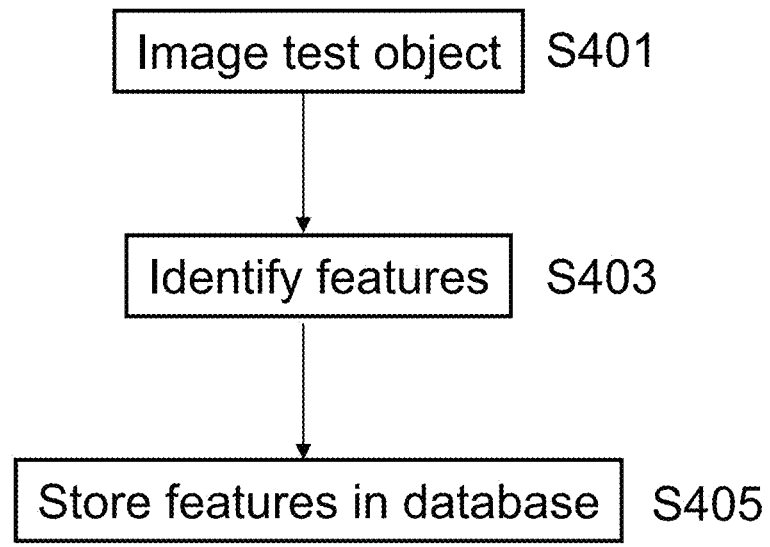
FIG. 5 is a flow diagram demonstrating how to capture features which can be used in a method accordance with an embodiment of the present invention.

Before object recognition can be performed, the system needs to be trained in order to store information concerning likely objects to be recognised. This will be described with reference to FIG. 5.

First, in step S401, an object or objects will be imaged using an apparatus similar to those described with reference to FIGS. 2 and 3 or other system suitable for capturing 3D data.

In this embodiment, a coordinate system is assigned for each object. In one embodiment, the origin of the system is at the center of the object, the directions of the axes of the system correspond to the orientation of the object, and one unit length in this system is equal to the scale of the object. The system is specified by a single 4×4 similarity transformation matrix, which transforms a point from the global coordinate system to the local coordinate system.

Figure 6:
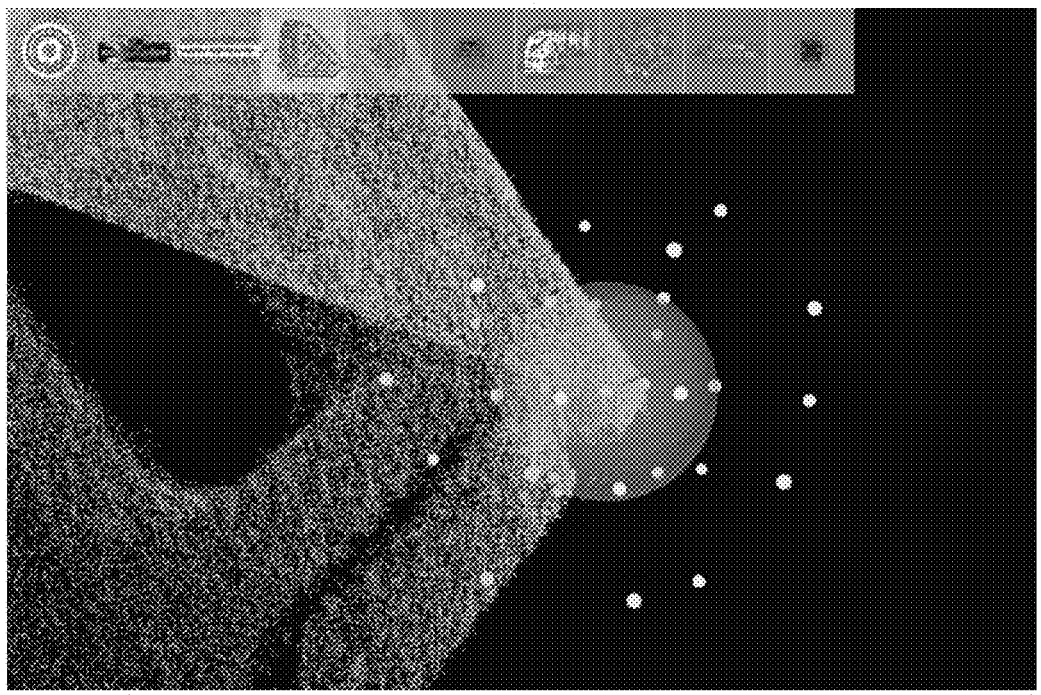
FIG. 6 is a photograph demonstrating a feature.

Features are extracted from the object. The features are spherical regions which are easily identified. An example of a feature is shown in FIG. 6.

How to identify features is known and will not be discussed further here. In this embodiment, a local coordinate system will be set for each feature. The origin of the system is at the feature's centre, the directions of the axes correspond to the feature's canonical orientation, and one unit length in the system is equal to the feature's radius. Again, the system is specified by a 4×4 transformation matrix, which transforms a point from the global coordinate system to the coordinate system of the feature. Within the feature's coordinate system, 31 points at prefixed locations close to the origin are sampled, creating a 31-dimensional descriptor vector. The tuple of (region center, region radius, orientation, descriptor) forms a feature and this is stored in step S405.

Thus, for each feature in the database both the transformation matrix of the feature's local coordinate system and that of the local coordinate system of the object associated to it is known. If the transform matrix for the feature is F1 and the transform matrix for the object is M1, then multiplying M1 with the inverse of F1, i.e. computing T=M1 (F1)^(−1), gives the transformation matrix T which transforms a point from the feature's local coordinate system to the associated object's local coordinate system.

Figure 7:
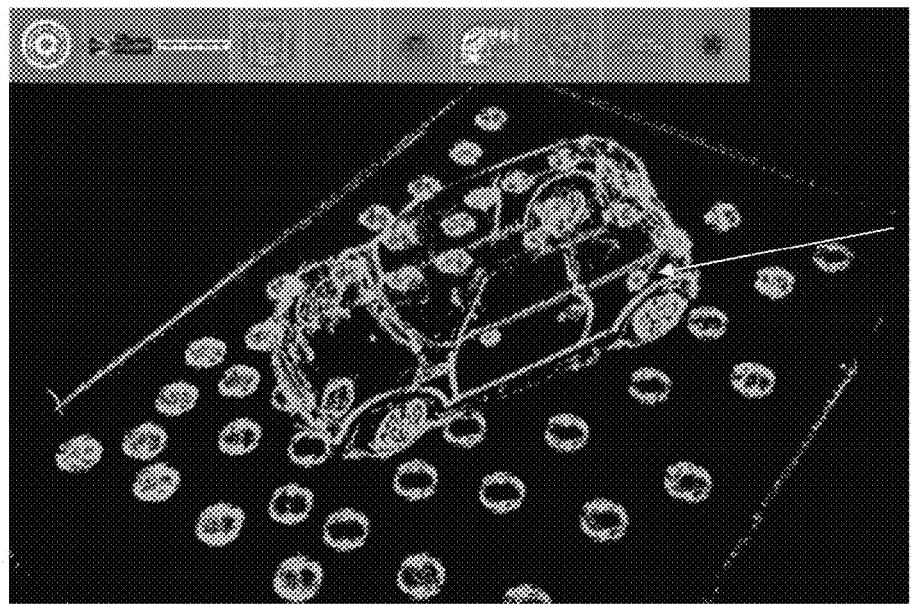
FIG. 7(a) is a point cloud generated from a captured 3-D image of an object and figure (b) shows the image of FIG. 7(a) with the extracted features.
Figure 7:
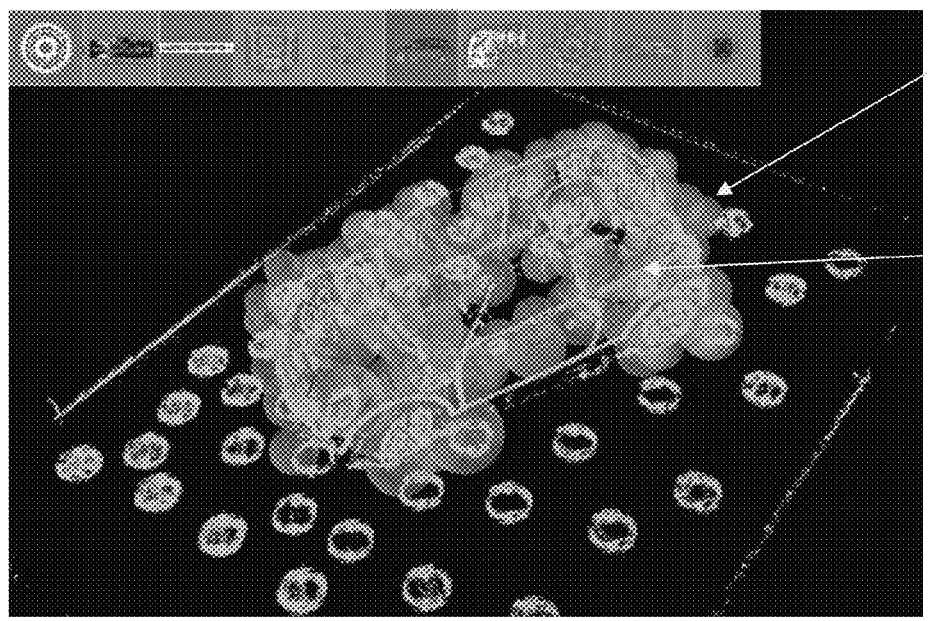

The matrix T is unchanged when the object is transformed by scaling, translation, and rotation. The above process is repeated for all objects specified in the scene. For example, for the object 61 in FIG. 7(b), FIG. 7(b) shows the features 63 which have been assigned to the object 61.

Figure 8:
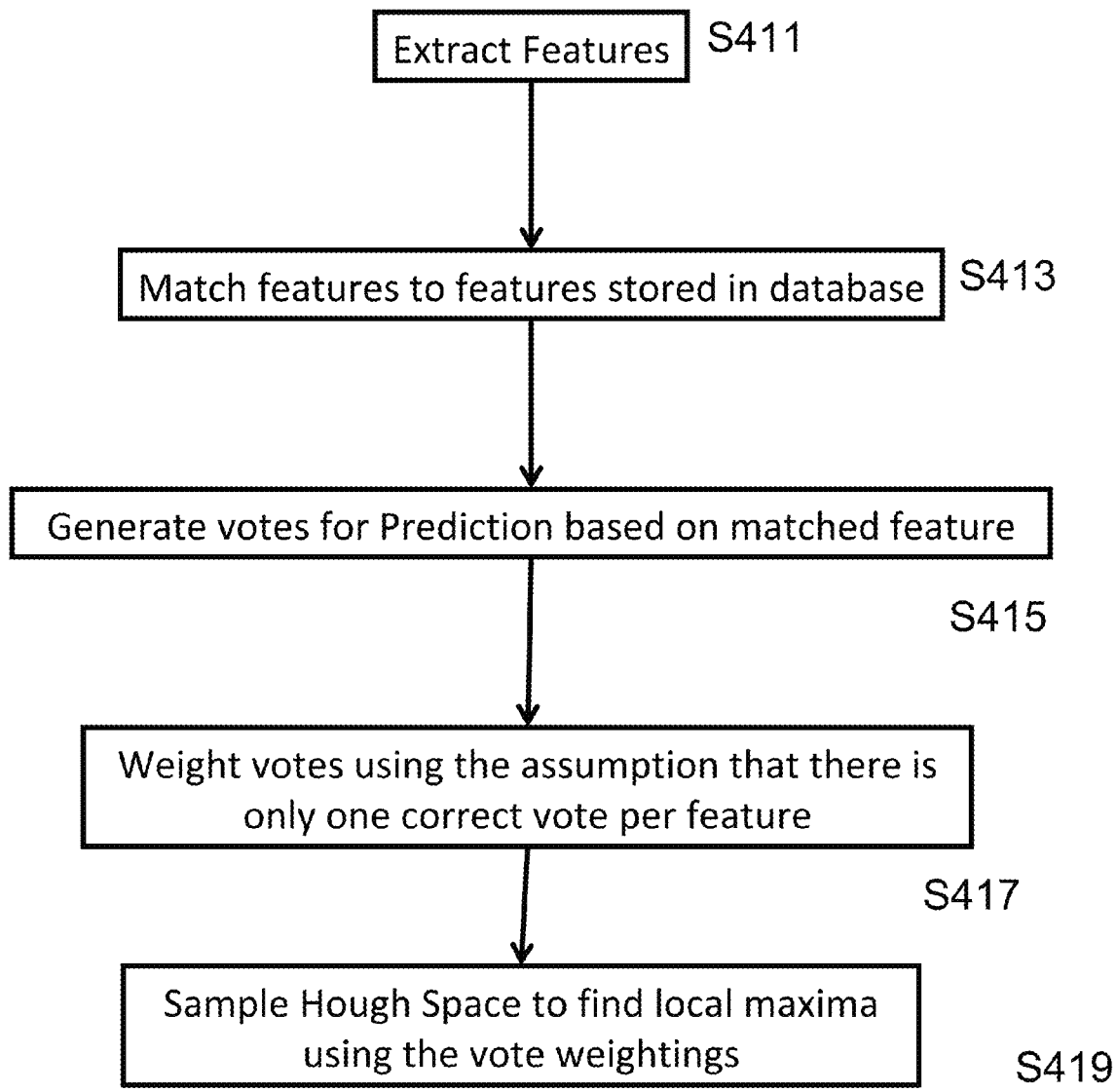
FIG. 8 is a flow chart of a method in accordance with an embodiment of the present invention.

During operation, which will be described with reference to FIG. 8, an image will be captured as explained with reference to FIGS. 2 and 3. Features will then be extracted from this image in step S411. The features will be described as explained above with reference to FIG. 5. If there is a match between a descriptor of a feature in the database with a feature extracted from the image, then a prediction is generated.

In an embodiment, there is a match between two descriptors if their Euclidean distance is below a threshold. Once there is a match between a feature extracted from the image and a feature in the database, a prediction is generated in step S415. The prediction is a hypothesis of what object is being recognised and where it is located.

In an embodiment, when a feature on the scene is matched, only the transformation matrix of the feature's local coordinate system is known. When two features are matched, it is assumed that the transformation matrix that transforms a point from the local coordinate system of the feature from the test scene to the local coordinate system of the predicted object is the same as T. Therefore, if the transformation matrix for the matched feature from the global coordinate system is F2, the transformation matrix representing the predicted object's local coordinate system is then given by multiplying T with F2, i.e. M2'=T F2. M2' then gives the scale, the centre point, and the orientation of the predicted object pose.

In summary, by matching two descriptors, two corresponding regions are deemed to have the same shape. As the object's identity, location, scale, and orientation in the feature from the database is known, the object can be transformed (by scaling, translating, and rotating) so that the feature from the database is moved, scaled and rotated to the same place with the feature from the scene. This is then used to predict that this object, after being transformed, is present in the scene.

The above method results in many predictions. The above method is just one way of enabling a feature-to-vote conversion process, i.e. the first stage of the process. However, many other feature-to-vote conversion processes could be used.

The second stage of the Hough transform may be considered to be a discriminative model of the posterior distribution of an object's location, y, in a Hough space, H, which is the space of all object poses (usually real) and, in the case of object recognition tasks, object classes (discrete).

The model is a non-parametric kernel density estimate based on the votes, $X=\{x_{ij}\}_{\forall i,j}$, cast in H, by N features, thus $$p(y \mid X, \omega, \theta) = \sum_{i=1}^{N} \omega_i \sum_{j=1}^{J_i} \theta_{ij} K(x_{ij}, y), \quad (1)$$

where $J_i$ is the number of votes generated by the $i^{th}$ feature, K(,) is a density kernel in Hough space which allows a blob to be formed centred around the point corresponding to a prediction in Hough space $\omega=\{\omega\}_{i=1}^{N}$ and $\theta=\{\theta_{ij}\}_{\forall i,j}$, are feature and vote weights respectively, such that $\omega_i, \theta_{ij} \leq 0, \forall_{i,j}$, $$\sum_{i=1}^{N} \omega_i = 1$$

and:

$$\sum_{j=1}^{J_i} \theta_{ij} = 1, \forall\, i \in \{1, \ldots, N\}. \quad (2)$$

For example, in the original Hough transform used for line detection, the features are edgels, votes are generated for a discrete set of lines (parameterized by angle) passing through each edgel, the kernel, K(_,_), returns 1 for the nearest point in the discretized Hough space to the input vote, 0 otherwise, and the weights, ω and θ are set to uniform distributions in the standard Hough transform.

The final stage of the Hough transform involves finding, using non-maxima suppression, the modes of this distribution whose probabilities are above a certain threshold value, t.

Finding the modes in H involves sampling that space, the volume of which increases exponentially with its dimensionality, d.

The summing of votes in the above Hough Transform can enable incorrect votes to generate significant modes in H. In a method in accordance with an embodiment, an assumption is made that only one vote per feature is correct. Further, in this method, a vote that is believed to be correct should explain away the other votes from that feature in step S417.

Here, rather than being given 0 a priori, it is optimized over its possible values, giving those votes which agree with votes from other features more weight than those which do not.

In one embodiment this is achieved by minimizing the information entropy of $p(y|X,\omega,\theta)$ with respect to θ. A lower entropy distribution contains less information, making it more peaky and hence having more votes in agreement. Since information in Hough space is the location of objects, minimizing entropy constrains features to be generated by as few objects as possible. This can be viewed as enforcing Occam's razor.

In this particular embodiment, the Shannon entropy, H, is minimised:

$$H = E[-\ln p(x)] = -\int p(x) \ln p(x) dx \quad (3)$$

Since computing entropy involves an integration over Hough space (here, very large), importance sampling is used to make this integration tractable.

In an embodiment, entropy is minimized whilst only sampling at the location of votes. In this case the value of θ is given by:

$$\theta = \underset{\theta}{\mathrm{argmin}} - \sum_{i=1}^{N} \sum_{j=1}^{J_i} \frac{p(x_{ij} \mid X, \omega, \theta)}{q(x_{ij})} \ln p(x_{ij} \mid X, \omega, \theta) \quad (4)$$

When determining θ according to equation (4), in an embodiment an optimization framework is used. Here, since $p(y|X,\omega,\theta)$ is a linear function of θ, and $-x \ln x$ is concave, as is a sum of concave functions, the cost function of equation (4) is concave. Its minimum therefore lies at an extremum of the parameter space, which is constrained by equation (2), such that the optimal value of $\theta=\{\theta_{ij}\}_{j=1}^{J_i}$ (i.e. the vector of feature i's vote weights) must be an all 0 vector, except for one 1.

The search space for each $\theta_i$ is therefore a discrete set of $J_i$ possible vectors, making the total number of possible solutions, $$\prod_{i}^{N} J_i.$$

It should be noted that this search space is not uni-modal—for example, if there are only two features and they each identically generate two votes, one for location y and one for location z, then both y and z will be modes. Furthermore, as the search space is exponential in the number of features, an exhaustive search is infeasible for all but the smallest problems.

In a further embodiment, a local approach, iterated conditional modes (ICM), is used to quickly find a local minimum of this optimization problem. This involves updating the vote weights of each feature in turn, by minimizing equation (4) conditioned on the current weights of all other votes, and repeating this process until convergence. The correct update equation for the vote weights of a feature f is as follows:

$$p_{fk}(y \mid X, \omega, \theta) = \omega_f K(x_{fk}, y) + \sum_{\forall i \neq f} \omega_i \sum_{j=1}^{J_i} \theta_{ij} K(x_{ij}, y), \quad (5)$$

$$k = \underset{k=1}{\overset{J_f}{\mathrm{argmin}}} - \sum_{i=1}^{N} \sum_{j=1}^{J_i} \frac{p_{fk}(x_{ij} \mid X, \omega, \theta)}{q(x_{ij})} \ln p_{fk}(x_{ij} \mid X, \omega, \theta), \quad (6)$$

$$\theta_{fk} = 1, \theta_{fj} = 0, \forall\, j \neq k. \quad (7)$$

However, since this update not only involves q(.), which is unknown, but is also relatively costly to compute, in an embodiment, it is replaced with a simpler proxy which in practice performs a similar job:

$$k = \underset{k=1}{\overset{J_f}{\mathrm{argmax}}}\, p_{fk}(x_{fk} \mid X, \omega, \theta). \quad (8)$$

In the above embodiment, the entropy is minimised while only sampling at the location of the votes. However, in a further embodiment, the Hough space is sampled at the locations Y={$y_i$}. The value of θ is therefore given as:

$$\theta = \underset{\theta}{\operatorname{argmin}} - \sum_i \frac{p(y_i \mid X, \omega, \theta)}{q(y_i)} \ln p(y_i \mid X, \omega, \theta) \quad (9)$$

where q(.) is the sampling distribution from which the votes are drawn. Once this optimization (described below) is done, the estimated θ is applied to equation (1) in step S419, and inference continues as per the standard Hough transform.

The cost function above is minimized by updating the vote weights of each feature in turn, minimizing the equation conditioned on the current weights of all other votes, and repeating this process a number of times, possibly until convergence. The correct update for the vote weights of a feature f is as follows:

$$\theta_{fk}=1, \theta_{fj}=0, \forall j \neq k \quad (10)$$

where $$k = \underset{k=1}{\overset{J_f}{\operatorname{argmin}}} - \sum_{i=1}^{M} \frac{p_{fk}(y_i \mid X, \omega, \theta)}{q(y_i)} \ln p_{fk}(y_i \mid X, \omega, \theta) \quad (11)$$

ICM proxy update equation, which can be used in place of the above equation:

$$k = \underset{k=1}{\overset{J_f}{\operatorname{argmax}}} p_{fk}(x_{fk} \mid X, \omega, \theta) \quad (12)$$

Using the above methods, which will be referred to as "minimum-entropy Hough transforms", detection precision may be increased.

In one embodiment, the weights are initially updated softly, i.e. the weights are not initially fixed to 0 or 1. This approach helps to avoid ordering bias and in this way helps to avoid falling into a poor local minimum early on, thus improving the quality of solution found.

Since the optimization is local, a good initialization of θ is helpful to reach a good minimum.

There are various methods which can be used for initializing vote weights in accordance with embodiments of the present invention.

In one embodiment, $\{\theta_{ij}\}_{j \in \{1 \ldots J\}}$ can be set to an initial set of values, for example, those defined by a uniform distribution:

$$\theta_{ij} = \frac{1}{J_i} \quad (13)$$

Next, an update rule can be applied to each vote weight either synchronously or asynchronously. Such an update rule may be applied a number of times, for example, 5 times.

In one embodiment, an update rule:

$$\theta_{ik} = \frac{p(x_{ik} \mid X, \omega, \theta)}{\sum_{j=1}^{J_i} p(x_{ij} \mid X, \omega, \theta)} \quad (14)$$

was applied.

In another embodiment, the value of θ used in the standard Hough transform is used initially, then the following update was applied to each vote weight simultaneously:

$$\theta_{ik} = \frac{p_{ik}(x_{ik} \mid X, \omega, \theta)}{\sum_{j=1}^{J_i} p_{ij}(x_{ij} \mid X, \omega, \theta)}, \quad (15)$$

Where $p_{ik}$ for the feature f is $$p_{fk}(y \mid X, \omega, \theta) = \omega_f K(x_{fk}, y) + \sum_{\forall i \neq f} \omega_i \sum_{j=1}^{J_i} \theta_{ij} K(x_{ij}, y) \quad (16)$$

Successive updates may be performed using either of the above rules to obtain an initial estimate of θ. In a further embodiment, these initial values of θ are then used before optimisation takes place using the ICM method described with reference to equations (6), (7), (8) or (10), (11) and (12). In a yet further embodiment, the obtained values of θ are used directly in the Hough transform of equation (1) and the above 1CM method is not used.

Although the Hough space increases exponentially with its dimensionality, the number of votes generated in applications using the Hough transform generally do not, implying that higher dimensional Hough spaces are often sparser. This sparsity is exploited by sampling the Hough space only at locations where the probability (given by equation (1)) is likely to be non-zero—at the locations of the votes themselves. By sampling, only at the known locations of the votes (a technique which will be referred to as "the intrinsic Hough transform" since the votes define the distribution), the memory requirements of the Hough transform are changed from $O(k^d)$, (k>1) to O(n), making it feasible for high-dimensional Hough spaces such as used for a 3D object registration application.

The minimum-entropy Hough transform explains away incorrect votes, substantially reducing the number of modes in the posterior distribution of class and pose, and improving precision. The following experiments demonstrate that these contributions make the Hough transform not only tractable but also highly accurate for the example application.

To demonstrate the above, an experiment was performed using experimental data consisting of 12 shape classes, for which there was both a physical object and matching CAD model.

Figure 9:
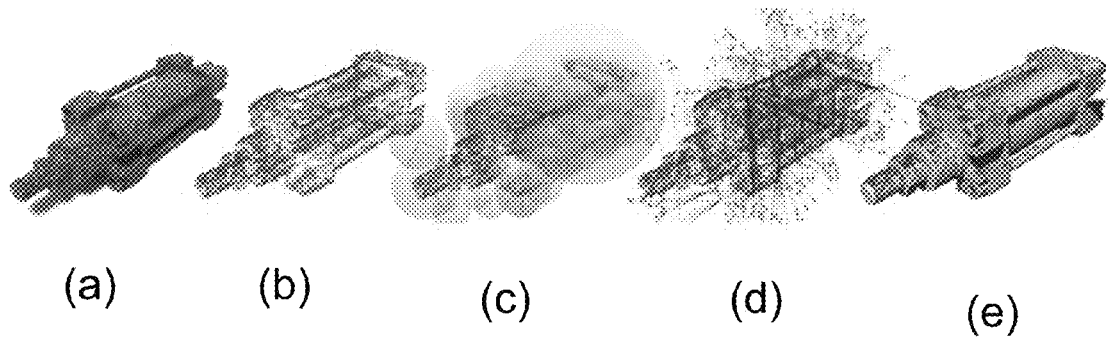
FIG. 9(a) is an object to be imaged and the image processed using a method in accordance with an embodiment of the present invention.
FIG. 9(b) is a point cloud of the object of FIG. 9(a)
FIG. 9(c) is the point cloud of FIG. 9(b) with detected features superimposed.
FIG. 9(d) is a depiction of the predicted poses generated after comparing the detected features with those of the database.
FIG. 9(e) is the registered CAD model returned by the system for the objection in FIG. 9(a)

The geometry of each object as shown in FIG. 9(a) was captured in the form of point clouds as shown in FIG. 9(b) 20 times from a variety of angles. Along with the class label, every shape instance has an associated ground truth pose, computed by first approximately registering the relevant CAD model to the point cloud manually, then using the Iterative Closest Point algorithm to refine the registration.

Given a test point cloud and set of training point clouds (with known class and pose), the computation of input pose votes X is a two stage process. In the first stage, local shape features, consisting of a descriptor and a scale, translation and rotation relative to the object, are computed on all the point clouds as shown in FIG. 9(c). This is done by first converting a point cloud to a $128^3$ voxel volume using a Gaussian on the distance of each voxel centre to the nearest point. Then interest points are localized in the volume across 3D location and scale using the Difference of Gaussians operator, and a canonical orientation for each interest point computed, to generate a local feature pose. Finally a basic, 31-dimensional descriptor is computed by simply sampling the volume (at the correct scale) at 31 regularly distributed locations around the interest point.

In the second stage each test feature is matched to the 20 nearest training features, in terms of Euclidean distance between descriptors. Each of these matches generates a vote as shown in FIG. 9(d) and FIG. 9(e) shows the registered CAD model.

Figure 10:
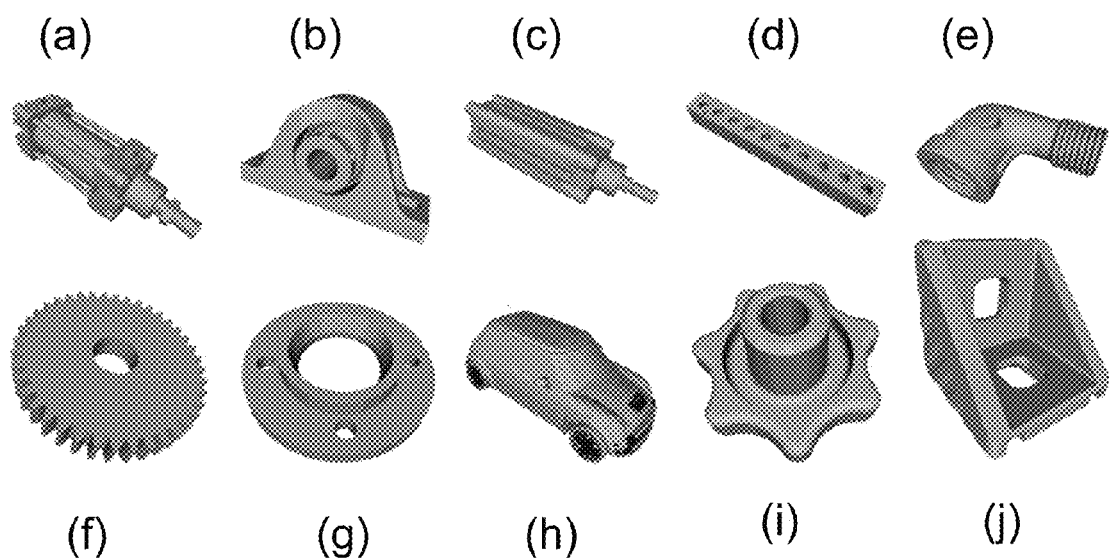
FIGS. 10(a) to 10(j) show industrial parts which are recognised and registered as an example using a method in accordance with an embodiment present invention.

12 classes were used in the evaluation as shown in FIG. 10, these are: a bearing, a block, a bracket, a car, a cog, a flange, a knob, a pipe and two pistons.

Figures 11, 12:
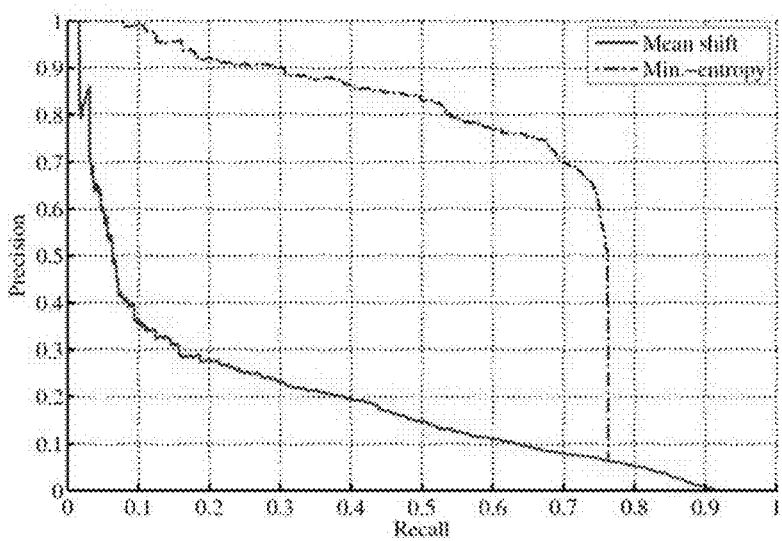
FIG. 11 is a confusion matrix for the objects of FIG. 10.
FIG. 12 is a plot showing precision against recall for object recognition and registration for a method in accordance with an embodiment of the present invention and a standard method.

Quantitative results are given in tables 1 & 2 and FIG. 11.

TABLE 1

|  | Mean Shift | Minimum Entropy Hough |
|---|---|---|
| Recognition | 64.9% | 98.5% |
| Registration | 68.3% | 74.6% |
| Time | 1.62 | 1.59 |

TABLE 2

|  | Bearing | Block | Bracket | Car | Cog | Flange | Knob | Pipe | Piston 1 | Piston 2 |
|---|---|---|---|---|---|---|---|---|---|---|
| Min Ent Hough | 83 | 20 | 98 | 91 | 100 | 36 | 91 | 89 | 54 | 84 |
| Mean Shift | 77 | 13 | 95 | 75 | 100 | 41 | 88 | 86 | 44 | 64 |

There is an increase in performance in both registration and recognition moving from the established mean shift technique to the above described technique which will be referred to as Minimum-entropy Hough which shows a significantly improved registration rate, and a hugely improved recognition rate over mean shift (a 96% reduction in misclassifications); only 1.5% of objects are left unrecognized, the majority of those in the car class.

However, because these results only reflect the best detection per test, they do not tell the whole story. It is not possible to tell from the above results how many other (incorrect) detections had competitive weights. To see this, the precision-recall curves shown in FIG. 12 are generated by varying the detection threshold, T. A correct detection in this test required the class and pose to be correct simultaneously, and allowed only one correct detection per test. The curves show that precision remains high as recall increases for the minimum entropy Hough transform which is able to explain away incorrect votes.

In terms of computation time (table 1), the two methods tested were of a similar speed. The benefit of explaining away incorrect votes is demonstrated in FIGS. 13(a) and 13(b). While the standard Hough transform shows a great deal of ambiguity as to where and how many objects there are, the minimum entropy Hough transform is able to clear away the "mist" of incorrect votes, leaving six distinct modes corresponding to the objects present; there are some other modes, but these are much less significant, corroborating the results seen in FIG. 12.

Figure 13:
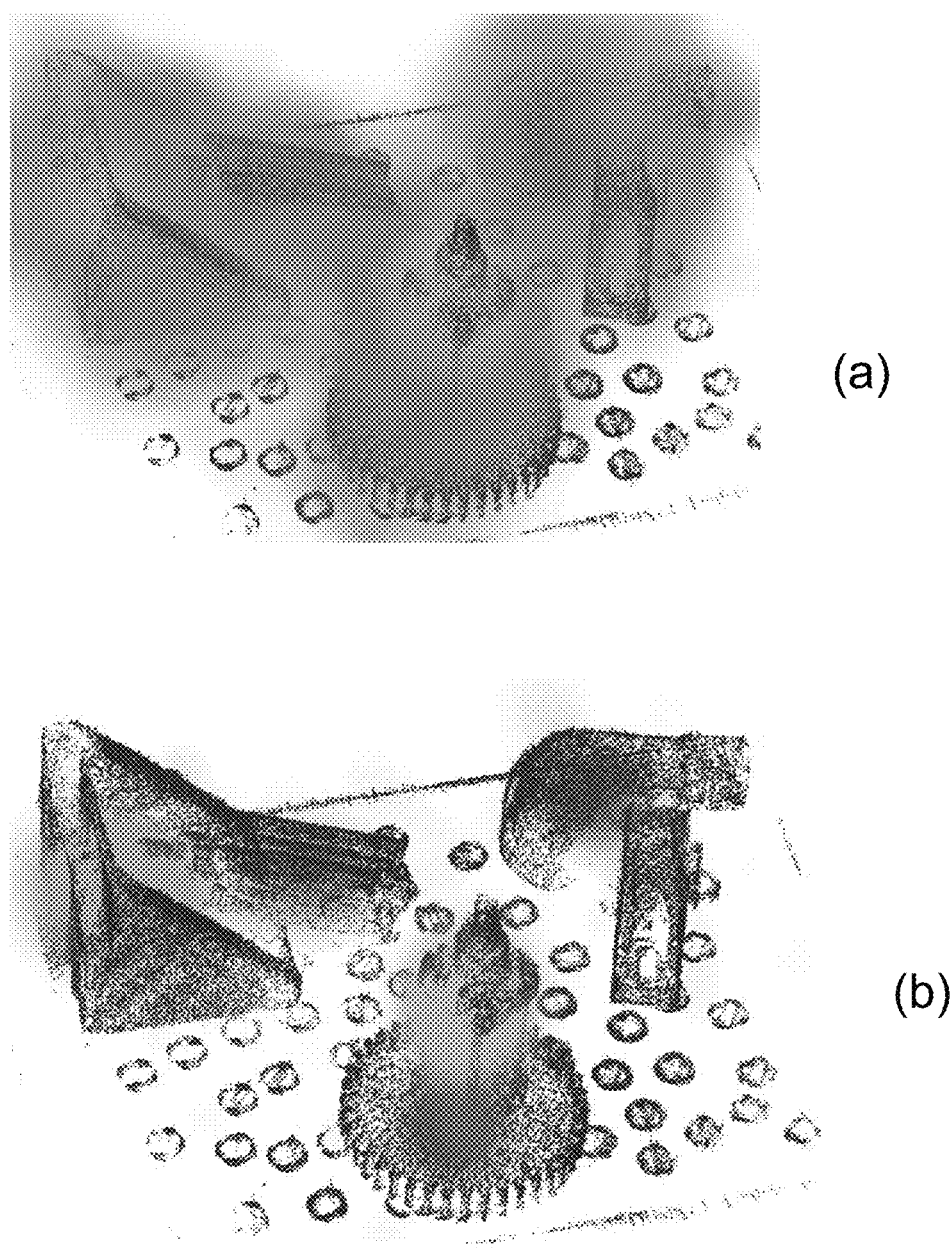
FIG. 13(a) shows the results of posterior distributions over 10 object classes for a standard Hough transform and FIG. 13(b) shows the corresponding results using a method in accordance with an embodiment of the present invention.
Figure 14:
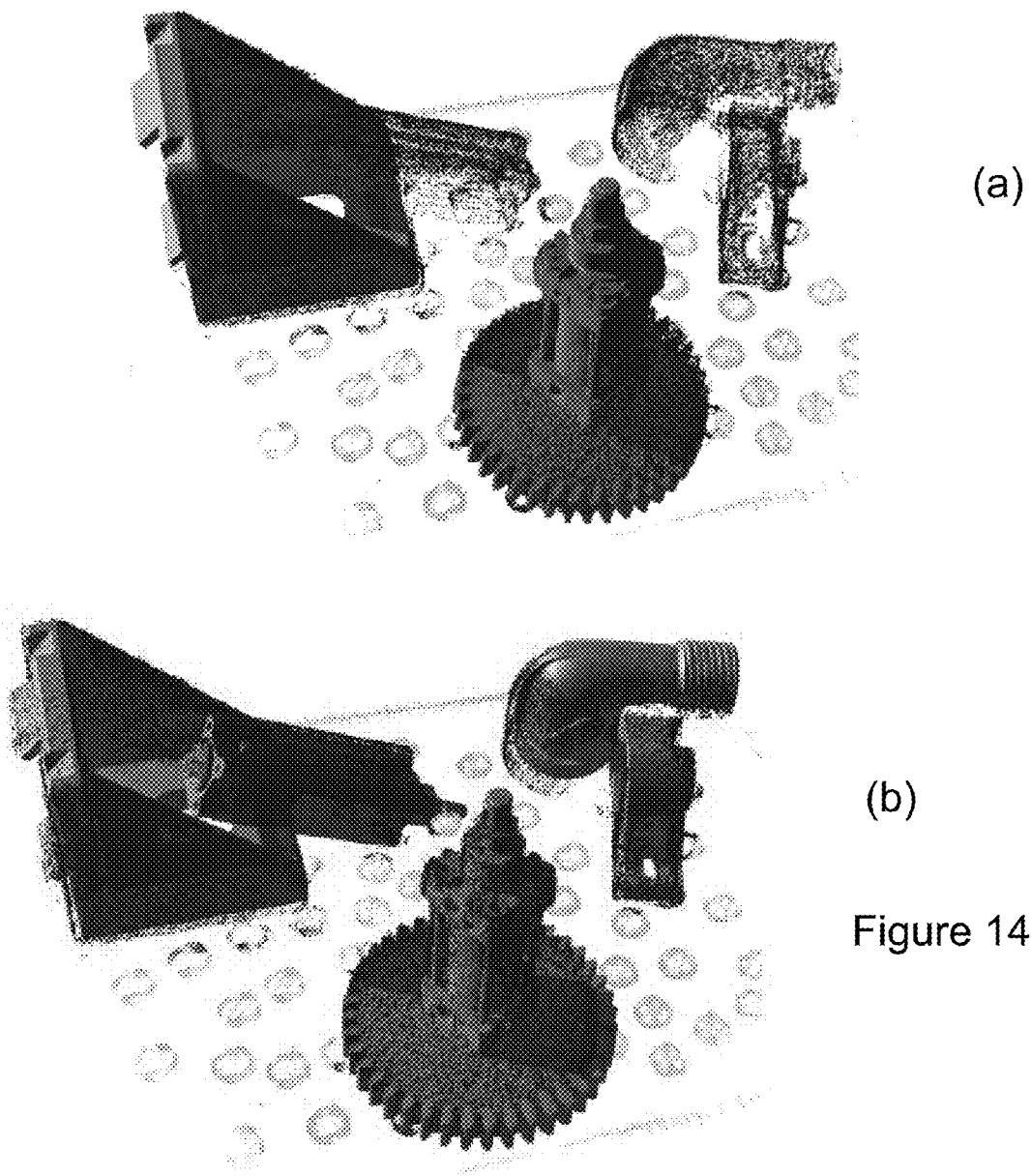
FIG. 14(a) shows the results of inference measurements for a standard Hough transform and FIG. 14(b) shows the corresponding results using a method in accordance with an embodiment of the present invention.

The benefit of having correct and clearly defined modes is demonstrated in FIGS. 14(a) and 14(b), using the same point cloud as in FIGS. 13(a) and 13(b), a challenging dataset containing three pairs of touching objects. The minimum-entropy finds all six objects in the top six detections (though mis-registers the piston lying at a shallow angle), whereas the other method finds not only incorrect objects, but also multiple instances of correct objects (particularly the piston on the cog).

The above explanation has concentrated on the use of the method for image processing and specifically the recognition and/or registration of physical objects in an image. However, methods in accordance with embodiments of the present invention can also be used to recognise and/or register data objects in order to provide an efficient method of searching a database.

For example, if there are two database lists $X=\{x_i\}$ and $Y=\{y_j\}$, and a data structure $Z=\{z_{ij}\}$, where $z_{ij}=1$ indicates that $x_i$ can vote for $y_j$, and $z_{ij}=0$ otherwise.

Given a list of observed $x_i$'s it is possible to use the above method using the minimum entropy Hough transform to estimate the minimal list of $y_i$'s present. To do this, each $x_i$ can be handled as a feature in the above method and each $y_j$ as an object. A feature can vote for an object in the same way as described above for image processing. A vote weight can then be applied to each vote and an assumption can be made that each feature can only have one correct vote. This condition is then imposed by calculating the minimum entropy with respect to the applied vote weights and using these vote weights in a Hough transform.

As a practical example of this:

The list X is a list of all the possible symptoms of disease a person can have;

The list Y is a list of all the possible diseases a person could have; and Z indicates which disease causes which symptoms.

Then, given a list of symptoms ($x_i$'s) from a real patient (the features), Z is used to generate a list of votes for the elements in Y (the Hough space). The minimum entropy Hough transform is used to generate the smallest list of $y_j$'s (diseases) that could plausibly have caused those $x_i$'s (symptoms).

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of methods and systems described herein may be made without departing from the spirit of the inventions. The accompanying claims and their equivalents are intended to cover such forms of modifications as would fall within the scope and spirit of the inventions.

The invention claimed is:

1. An object location method, comprising:

analysing data comprising a plurality of objects wherein each object exhibits a plurality of features, and extracting said features from said data;

matching features stored in a database with those extracted from said data, and deriving a prediction of the object, wherein each feature extracted from the data provides a vote for at least one prediction;

expressing the prediction to be analysed in a Hough space, wherein the objects to be analysed are described by n parameters and each parameter defines a dimension of the Hough space, where n is an integer of at least one;

providing a constraint implemented by applying a higher weighting to votes which agree with votes from other features than those votes which do not agree with votes from other features;

finding local maxima in the Hough space using the weighted votes; and identifying the predictions associated with the local maxima to locate the objects provided in the data, wherein the constraint is provided by minimising the information entropy of $p(y|X\omega,\theta)$ with respect to $\theta$, where y is the prediction of the object in Hough Space H which is the space of all object predictions, $X=\{x_{ij}\}_{\forall i,j}$ is a vote cast in H by N features, where i represents a feature, j represents a vote from the $i^{th}$ feature and $\omega=\{\omega_i\}$ is a weight attributed to a feature and $\theta=\{\theta_{ij}\}_{\forall i,j}$ is a weight attributed to a vote.

2. A method according to claim 1, wherein the value of $\theta$ is given by:

$$\theta = \underset{\theta}{\operatorname{argmin}} - \sum_i \frac{p(y_i|X,\omega,\theta)}{q(y_i)} \ln p(y_i|X,\omega,\theta)$$

where p(A|B) is the posterior probability that A is observed given B, q(.) represents the sampling distribution from which the votes are drawn and the Hough space is sampled at the locations $Y=\{y_i\}$.

3. A method according to claim 1, wherein the local maxima are located by sampling the Hough space at predefined intervals.

4. A method according to claim 2, wherein $\theta$ is minimised conditioned on the current weight of all other votes and wherein the process is repeated until convergence, wherein the vote weights for a feature f are updated by:

$$\theta_{fk}=1, \theta_{fj}=0, \forall j \neq k$$

where $$k = \underset{k=1}{\overset{J_f}{\operatorname{argmin}}} - \sum_{i=1}^{M} \frac{p_{fk}(y_i|X,\omega,\theta)}{q(y_i)} \ln p_{fk}(y_i|X,\omega,\theta)$$

5. A method according to claim 4, wherein k is simplified by substitution to:

$$k = \underset{k=1}{\overset{J_f}{\operatorname{argmax}}} p_{fk}(x_{fk}|X,\omega,\theta)$$

6. An object location method, comprising:

analysing data comprising a plurality of objects wherein each object exhibits a plurality of features, and extracting said features from said data;

matching features stored in a database with those extracted from said data, and deriving a prediction of the object, wherein each feature extracted from the data provides a vote for at least one prediction;

expressing the prediction to be analysed in a Hough space, wherein the objects to be analysed are described by n parameters and each parameter defines a dimension of the Hough space, where n is an integer of at least one;

providing a constraint implemented by applying a higher weighting to votes which agree with votes from other features than those votes which do not agree with votes from other features;

finding local maxima in the Hough space using the weighted votes; and identifying the predictions associated with the local maxima to locate the objects provided in the data, wherein an estimate of the vote weights $\theta$ is obtained and then the vote weights are updated using:

$$\theta_{ik} = \frac{p_{ik}(x_{ik}|X,\omega,\theta)}{\sum_{j=1}^{J_i} p_{ij}(x_{ij}|X,\omega,\theta)},$$

where y is the prediction of the object in Hough Space H which is the space of all object predictions, $X=\{x_{ij}\}_{\forall i,j}$ is a vote cast in H by N features, where i represents a feature, j represents a vote from the $i^{th}$ feature, $\omega=\{\omega_i\}$ is a weight attributed to a feature and $\theta=\{\theta_{ij}\}_{\forall i,j}$ is a weight attributed to a vote and from the feature f:

$$p_{fk}(y|X,\omega,\theta) = \omega_f K(x_{fk},y) + \sum_{\forall i \neq f} \omega_i \sum_{j=1}^{J_i} \theta_{ij} K(x_{ij},y).$$

7. A method according to claim 6, wherein the local maxima are located by sampling the Hough space at the points where votes are cast.

8. An object location method, comprising:

analysing data comprising a plurality of objects wherein each object exhibits a plurality of features, and extracting said features from said data;

matching features stored in a database with those extracted from said data, and deriving a prediction of the object, wherein each feature extracted from the data provides a vote for at least one prediction;

expressing the prediction to be analysed in a Hough space, wherein the objects to be analysed are described by n parameters and each parameter defines a dimension of the Hough space, where n is an integer of at least one;

providing a constraint implemented by applying a higher weighting to votes which agree with votes from other features than those votes which do not agree with votes from other features;

finding local maxima in the Hough space using the weighted votes; and identifying the predictions associated with the local maxima to locate the objects provided in the data, wherein the method is configured to relate to identifying objects in an image, wherein the data to be analysed is image data and wherein the object is a physical object captured in the image, wherein the Hough space is defined by at least 7 dimensions, wherein one dimension represents the ID of the object, 3 represent the translation of the object with respect to a common coordinate system and 3 represent the rotation of the object with respect to the common coordinate system.

9. An object location method, comprising:

analysing data comprising a plurality of objects wherein each object exhibits a plurality of features, and extracting said features from said data;

matching features stored in a database with those extracted from said data, and deriving a prediction of the object, wherein each feature extracted from the data provides a vote for at least one prediction;

expressing the prediction to be analysed in a Hough space, wherein the objects to be analysed are described by n parameters and each parameter defines a dimension of the Hough space, where n is an integer of at least one;

providing a constraint implemented by applying a higher weighting to votes which agree with votes from other features than those votes which do not agree with votes from other features;

finding local maxima in the Hough space using the weighted votes; and identifying the predictions associated with the local maxima to locate the objects provided in the data, wherein the Hough space is defined by:

$$p(y \mid X, \omega, \theta) = \sum_{i=1}^{N} \omega_i \sum_{j=1}^{J_i} \theta_{ij} K(x_{ij}, y).$$

10. A method according to claim 2, wherein θ is optimised by sampling the Hough space only at the location of votes.

11. An object location method, comprising:

analysing data comprising a plurality of objects wherein each object exhibits a plurality of features, and extracting said features from said data;

matching features stored in a database with those extracted from said data, and deriving a prediction of the object, wherein each feature extracted from the data provides a vote for at least one prediction;

expressing the prediction to be analysed in a Hough space, wherein the objects to be analysed are described by n parameters and each parameter defines a dimension of the Hough space, where n is an integer of at least one;

providing a constraint implemented by applying a higher weighting to votes which agree with votes from other features than those votes which do not agree with votes from other features;

finding local maxima in the Hough space using the weighted votes; and identifying the predictions associated with the local maxima to locate the objects provided in the data, wherein the method is configured to return a list of search results from a plurality of search criteria, wherein the objects to be located are the search results and the features which vote for the objects are the search criteria, the search results relating to diseases from which a patient may suffer and the search criteria being the symptoms presented by the patient.

12. A carrier medium carrying computer readable instructions configured to cause a computer to perform the method of claim 9.

13. An apparatus for locating an object, said apparatus comprising a processor, said processor being configured to:

analyse data comprising a plurality of objects wherein each object comprises a plurality of features, and extracting said features from said data;

match features stored in a database with those extracted from said data, and deriving a prediction of the object, wherein each feature extracted from the data provides a vote for at least one prediction;

express the prediction to be analysed in a Hough space, wherein the objects to be analysed are described by n parameters and each parameter defines a dimension of the Hough space, where n is an integer of at least one;

provide a constraint implemented by applying a higher weighting to votes which agree with votes from other features than those votes which do not agree with votes from other features;

find local maxima in the Hough space using the weighted votes; and identify the predictions associated with the local maxima to locate the objects provided in the data, wherein the Hough space is defined by:

$$p(y \mid X, \omega, \theta) = \sum_{i=1}^{N} \omega_i \sum_{j=1}^{J_i} \theta_{ij} K(x_{ij}, y).$$

* * * * *